Jan. 17, 1967  A. J. KEIM  3,298,744
TRAILER HITCH FOR DUMP TRUCK
Filed April 28, 1965
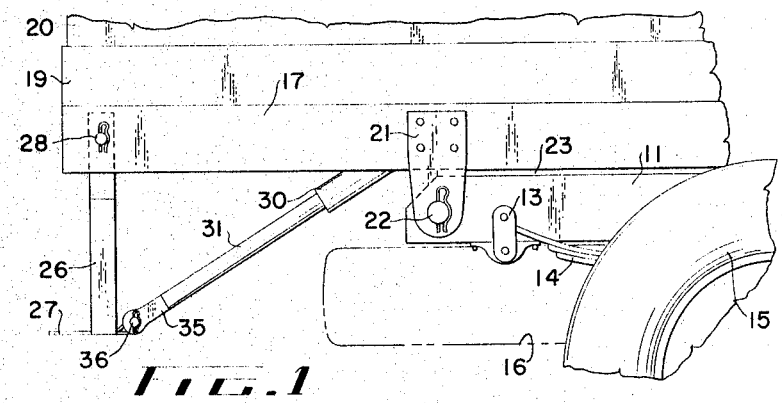
FIG. 1
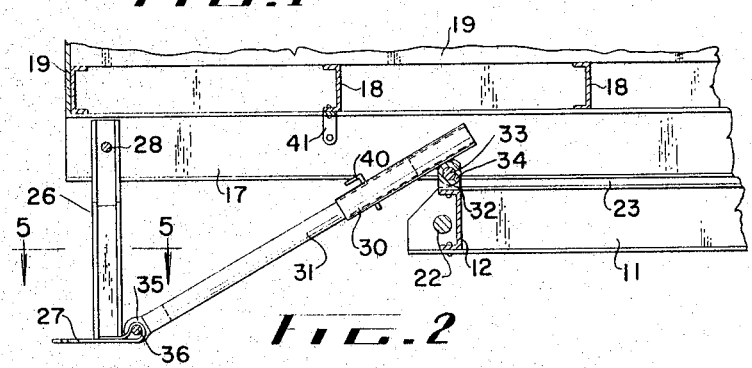
FIG. 2
FIG. 3
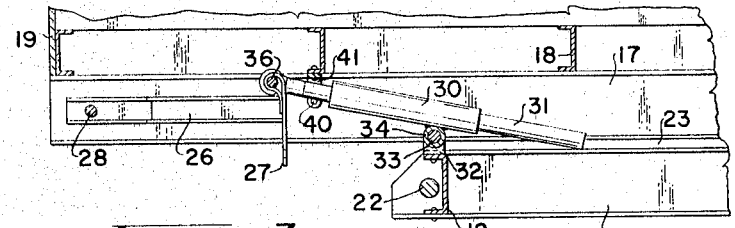
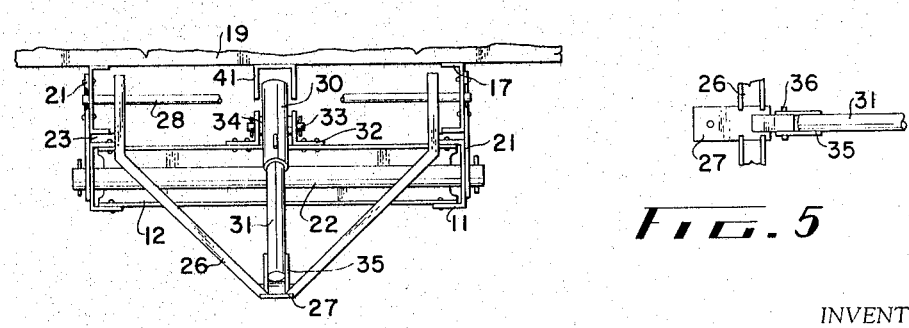
FIG. 4
FIG. 5
INVENTOR.
ALLEN J. KEIM
BY Peter J. Murphy
ATTORNEY United States Patent Office 3,298,744
Patented Jan. 17, 1967

3,298,744
TRAILER HITCH FOR DUMP TRUCK
Allen J. Keim, R.R. 1, Levee Township,
Pike County, Ill. 62343
Filed Apr. 28, 1965, Ser. No. 451,388
14 Claims. (Cl. 298—17)

This invention relates to a trailer hitch for a truck and, more particularly, to a collapsible wagon hitch assembly for use with a truck having a platform type body which permits the use of an under-body hoist to dump the platform type body.

In certain farming operations it is desired to tow wagons, such as grain wagons, for a considerable distance; and it is frequently more economical to do such towing with a truck rather than with a tractor. A problem exists in the towing of a wagon with a truck having a platform type body since the platform type body is at a considerable height above the ground in relation to the height of the hinge connection for a wagon tongue. Because of this, if the wagon tongue is attached to the rearmost end of the platform body, the tongue will extend upwardly from the hinge connection to the truck body at a substantial angle, placing considerable strain on the wagon tongue and its associated mounting particularly if the wagon is towed over rough terrain. It is desirable, therefore, to provide a hitch assembly which extends downwardly from the truck body so that the wagon tongue may be coupled to the truck hitch in a manner that the tongue is disposed generally parallel to the ground. If such a hitch is permanently secured to the truck body or difficult to remove, this may cause considerable inconvenience when the truck is not used for towing purposes. For example, the hitch assembly may engage the ground when the truck is operated over rough terrain, it may be vulnerable to damage when the truck is backed toward other structures for loading purposes, and it may interfere with the dumping of a platform type body which is provided with an under-body hoist.

A primary object of this invention is to provide a hitch assembly for a truck having a platform type body, the hitch assembly extending downward from the truck body to convenient wagon tongue height for towing a wagon, and the hitch assembly being readily collapsed to a stored position under the truck body. Another object of this invention is to provide a hitch assembly for a vehicle which is very readily shifted between a towing position and a stored position and which is entirely self-contained on the vehicle body. A further object of this invention is to provide a hitch assembly for a truck which is mounted partially on the truck chassis and partially on the platform type body; and which, in the stored position, permits the dumping of the platform type body relative to the truck chassis.

Generally, the hitch assembly consists of a bracket which is hingedly attached to the truck at the rearward end of the platform body to swing about a transverse hinge axis. A hitch member, to which the wagon tongue is connected, is secured to the end of the bracket remote from the hinge connection, to lie at wagon tongue height when the bracket is suspended in towing position. A tow bar consists of telescoping members, one of which is hingedly connected to the hitch member and the other of which is hingedly connected to a portion of the truck body forwardly of the bracket mounting. In the towing position of the hitch assembly, the telescoping members are extended and are rigidly locked together to define a rigid towing connection between the truck body and the hitch member. To move the assembly to the stored position, the telescoping members are collapsed as the bracket is swung rearwardly and upwardly to a generally horizontal position; and the assembly is secured in this position under the platform body.

The novel features of the invention, as well as additional objects and advantages thereof, will be understood more fully from the following description when read in connection with the accompanying drawing, in which:

FIG. 1 is a fragmentary side view of the rearward end of a truck having a platform type body, and having a wagon hitch assembly mounted thereon.

FIG. 2 is a fragmentary longitudinal sectional view of the rearward end of the truck of FIG. 1, taken in a vertical plane through the center of the truck body, showing the wagon hitch assembly in the towing position.

FIG. 3 is a view similar to that of FIG. 2, showing the wagon hitch assembly in the stored position.

FIG. 4 is a fragmentary rear end view of the truck of FIG. 1, showing the wagon hitch assembly in the towing position; and FIG. 5 is a fragmentary view of a portion of the wagon hitch assembly, as viewed along the line 5—5 of FIG. 2 looking in the direction of the appended arrows.

Referring to the drawing in detail, FIG. 1 is a side view of a portion of the rearward end of a truck carrying a platform type body which is pivotally mounted on the truck chassis or frame for dumping. The illustrated portions of the truck chassis include longitudinal frame members 11 and a transverse frame member 12 extending between the longitudinal members at the rearward ends thereof. Spring shackles 13 are mounted adjacent the rearward ends of the frame members 11 for supporting the rearward ends of leaf springs 14. The leaf springs 14, of course, support the rear axle; and one of the rear wheels 15 is shown. The usual position for a spare wheel and tire carried under the chassis is shown by the phantom lines 16.

The truck illustrated in FIG. 1 is provided with a platform type body which is supported on the longitudinal frame members 11 of the truck chassis. As best shown in FIGS. 1 and 2, the platform body consists of longitudinal sills 17, transverse sills 18, secured to the longitudinal sills by means of welding for example, and longitudinal floor boards 19 secured to the transverse sills by means of screws for example. The transverse sills and the edges of the floor boards are enclosed by a skirt 19 around the edge of the platform; and the platform may include vertical walls 20 to define a box on the platform body for hauling grain or other materials. In the illustrated truck, the platform body is a dumping body which is pivotally mounted at the rearward end of the chassis frame members 11 by means of bearing plates 21 which are bolted or otherwise secured to the sides of the sills 17 as best shown in FIGS. 1 and 4. A transverse journal bar 22 passes through bearing openings in the frame members 11 and through bearing openings in the plates 21 to define the pivotal connection between the platform body and the truck chassis. Suitable clip pins in the ends of the journal bar 22 retain the bar in position. The platform body may be dumped by means of well known hydraulic mechanisms, which raise the forward end of the platform body from the truck chassis. In the normal position of the platform body, the longitudinal sills 17 ride directly on the longitudinal frame members 11, and cushion strips 23 are provided between these members.

The hitch assembly includes a generally V-shaped bracket 26 which is defined by a pair of channels welded or otherwise secured to a hitch plate 27 formed from a metal strap, for example. In the towing position of the hitch assembly, illustrated in FIGS. 1, 2 and 4, the V-shaped bracket is disposed in a vertical plane with the bracket arms extending upwardly from the hitch plate 27 which is disposed generally horizontally relative to the ground. The upper ends of the bracket arms are pivotally attached to the longitudinal sills 17 of the platform body by means of a pivot bar 28. The pivot bar 28 passes transversely through suitable holes provided in the sills 17 adjacent the ends thereof, and through holes in the ends of the bracket arms 26 which lie inside the sills 17. The pivot bar 28 is secured within the sills 17 by means of suitable clip pins, for example. The hitch plate 27 extends rearwardly from the bracket 26 and is provided with a hole by means of which a wagon tongue is secured to the hitch plate. The forward end of the hitch plate is folded back upon itself to define a bearing for a hinge connection.

The bracket 26 is rigidly supported in the vertical or towing position by means of a tow bar consisting of a sleeve 30 and a bar 31 which is telescopically received within the sleeve 30. The sleeve 30 is pivotally mounted on the transverse frame member 12 of the truck chassis by means of L-shaped brackets 32, best seen in FIG. 4, which define bearings for a pivot pin 33. The pivot pin 33 passes through a short bearing sleeve 34 which is welded or otherwise secured to the tow bar sleeve 30. The bar 31 of the tow bar assembly includes a pair of bearing plates 35, best shown in FIG. 5, which are welded or otherwise secured to the rearward end of bar 31. The bearing plates 35 are provided with aligned holes for receiving a pivot pin 36 which passes through the bearing defined by the hitch plate 27; and by this means the tow bar is pivotally connected to the hitch plate.

In the towing position of the hitch assembly, the sleeve 30 and the bar 31 are relatively extended and are locked in this extended condition by means of a pin 40 which is inserted through aligned holes in the sleeve and bar, the pin 40 being suitably secured against withdrawal through vibration. In this position of the hitch assembly then the bracket 26 lies in a vertical plane and is rigidly held in this position by the tow bar. The pulling load of the hitch assembly is borne by the truck chassis through the sleeve 30, the bar 31 and the hitch plate 27, and the associated connections between these members. The bracket 26 and pivot bar 28 serve primarily to support the tongue load of the towed wagon.

When it is desired to collapse the hoist assembly to the stored position, the pin 40 is removed from the sleeve 30 and bar 31, permitting the bracket 26 to be swung about its pivot axis. The bracket 26 is swung forwardly and upwardly, wherein the bar 31 slides within the sleeve 30. The physical arrangement is such that the bracket 31 may be swung to the horizontal position shown in FIG. 3. In this position the bar 31 is received between the downwardly extending arms of a bracket 41, which is suitably secured to one of the transverse sills 18 or other suitable structural member of the platform body. The pin 40 may then be passed through aligned holes at the lower ends of the bracket 41 to hold the rearward end of the tow bar assembly in the stored position, and this inherently secures the bracket 26 in the horizontal position. Again, the pin 40 is secured against withdrawal. Significantly, the pin 40 for securing the hitch assembly in the stored position is the same pin which locks the assembly in the towing position; therefore, this pin is always secured in the assembly so that it is not necessary to carry extra parts in the truck for shifting the hitch assembly from the towing position to the stored position or vice versa.

The hitch assembly is particularly well adapted for use with a truck having a platform type body and an underbody hoist for dumping the body. It will be noted in the drawing that the pivot axis (journal bar 12) for the platform body and the pivot axis (pivot pin 33) for the sleeve 30 do not coincide. This means that when the platform body is dumped there must be some relative movement between the sleeve 30, which is attached to the truck chassis, and the bar 31, which is attached to the platform body. Such relative movement is permitted, of course, since the sleeve and bar are not locked together in the stored position.

A feature of the invention is the provision of a trailer hitch which is collapsible and movable to a stored position when it is not required for towing purposes. An ancillary feature is that the transition between the towing position and the storing position is readily accomplished merely by the removal of the pin 40 from one securing position to another securing position.

Another feature of the invention is that the hitch assembly in the stored position does not interfere with other normal operations of the truck, particularly the dumping of the platform body, since it is stored almost completely within the structure of the platform body, that is between the sills 17. This is particularly significant in relation to the normal position of the spare wheel and tire 16, shown in FIG. 1, when the platform body is dumped. A further important feature is that the telescoping design permits mounting of a portion of the assembly on the dumping body and a portion of the assembly on the truck chasses, yet without interfering with the dumping function of the platform body.

What is claimed is:

1. A trailer hitch assembly for use with a vehicle having an overhanging platform type body comprising:
    a support bracket having hinge means at one end for hinged connection to a supporting structure; a hitch plate mounted at the other end of said bracket, disposed to be coupled to a trailer tongue when the bracket is suspended from the supporting structure in a generally vertical towing position;
    a telescoping tow bar hingedly connected at one end to said hitch plate, and having hinge means at the other end for hinged connection to the supporting structure;
    means for locking said telescoping tow bar in an extended position to define a rigid towing connection between said hitch plate and said supporting structure; and said tow bar being telescopically collapsible to permit the swinging of said bracket about its hinge means to a generally horizontal stored position.

2. The trailer hitch assembly set forth in claim 1 wherein said tow bar in said extended position defines the maximum distance between said two tow bar hinge means, and wherein said tow bar in collapsed position defines the minimum distance between said two tow bar hinge means; and the difference between said minimum and maximum distances being greater than the distance between said bracket hinge means and said hitch plate, whereby said tow bar permits said bracket to be swung from a generally vertical towing position to a generally horizontal stored position.

3. The trailer hitch assembly set forth in claim 1 wherein said tow bar includes a bar hingedly connected to said hitch member and a sleeve slidably enclosing said bar, said sleeve having said hinge means for hinged connection to the supporting structure;
    said bar and said sleeve having transverse holes which may be aligned in one relative position thereof; and a pin dimensioned to be passed through said aligned holes to define said rigid towing connection.

4. The trailer hitch assembly set forth in claim 1 wherein said support bracket is V-shaped; said hitch plate being mounted at the apex of said V-shaped bracket and said bracket hinge means being disposed adjacent to the ends of the bracket arms remote from the apex.

5. In combination with a vehicle having a rearwardly overhanging body, a trailer hitch assembly comprising:
    a bracket hingedly connected at one end to said overhanging body to swing between a generally vertical position and a generally horizontal position; a hitch plate mounted at the other end of said bracket in position to be coupled to a trailer tongue when said bracket is in the generally vertical towing position;
    an adjustable length tow bar hingedly connected at one end to said hitch plate, and hingedly connected at the other end to said vehicle forwardly of said bracket hinge connection;

means for locking said tow bar in an extended position wherein said bracket is disposed in a generally vertical position and wherein said tow bar defines a rigid towing connection between said hitch plate and said vehicle; and said tow bar being collapsible longitudinally to permit said bracket to be swung to a generally horizontal stored position under said overhanging body.

6. The combination set forth in claim 5 wherein said tow bar comprises a sleeve hingedly connected to said vehicle, and a bar slidable through said sleeve hingedly connected to said hitch plate;

said sleeve and said bar having transverse holes which are aligned in said extended position of said tow bar; and a pin dimensioned to be received in said holes for locking said sleeve and said bar in said extended position.

7. The combination set forth in claim 5 wherein said tow bar comprises two telescoping members movable axially relative to each other, said members being hingedly connected, respectively, to said hitch plate and to said vehicle;

said members being provided with transverse holes which are aligned in said extended position of said tow bar; and a pin dimensioned to be received in said holes for locking said tow bar in said extended position.

8. The combination set forth in claim 7 including:

a forklike bracket mounted on said vehicle body in position to receive a portion of said trailer hitch assembly when said bracket and said tow bar are stored in the generally horizontal position; and said fork bracket having aligned holes to receive said pin, for securing said assembly in said stored position.

9. The combination set forth in claim 5 wherein said bracket is generally V-shaped; said hitch plate being mounted at the apex of said V-shaped bracket; and said bracket having hinge means at the ends of the arms of said V-shaped bracket, remote from the apex thereof, for hingedly connecting said bracket to said overhanging body.

10. The combination set forth in claim 5 wherein said tow bar, in said extended position, defines a maximum distance between the hinge connection to the hitch plate and the hinge connection to the vehicle and, in the collapsed position, defines a minimum distance between said hinge connections; and the difference between said minimum and maximum distances being greater than the distance between said tow bar hinge connection to said hitch plate and said bracket hinge connection to said body, whereby said tow bar permits said brackets to be swung from the generally vertical towing position to the generally horizontal stored position.

11. In combination with a vehicle having a frame; an overhanging platform type body mounted on said frame, including a pair of longitudinal sills; a trailer hitch assembly comprising:

a bracket hingedly connected at one end between said sills to swing between a generally vertical position and a generally horizontal position; a hitch plate mounted at the other end of said bracket, to extend rearwardly therefrom when said bracket is disposed in a generally vertical towing position, for coupling to the tongue of a towed vehicle;

an adjustable length tow bar hingedly connected at one end to the forward end of said hitch plate, and hingedly connected at the other end to said vehicle frame forwardly of said bracket hinge connection;

means for locking said tow bar in an extended position wherein said bar extends rearwardly and downwardly from said frame connection to said hitch plate connection, to position said bracket in said towing position and to define a rigid connection between said frame and said hitch plate; said tow bar being collapsible longitudinally to permit said bracket and said hitch plate to be swung forwardly and upwardly to a generally horizontal stored position between said sills;

and means for securing said bracket and said tow bar in said stored position.

12. The combination set forth in claim 11 wherein said tow bar consists of a sleeve hingedly connected to said vehicle frame and a bar hingedly connected to said hitch plate and slidable through said sleeve; and wherein said tow bar locking means includes a pin receivable in transversely aligned holes through said sleeve and said bar.

13. The combination set forth in claim 12 wherein said means for securing said bracket and said tow bar in said stored position includes a forklike bracket mounted on said platform body, extending downward therefrom to receive said tow bar; said forklike bracket having aligned apertures for receiving a pin to retain said tow bar;

and said pin being the same pin employed to lock said tow bar in extended position.

14. The combination set forth in claim 11 wherein said platform type body is pivotally mounted on said vehicle frame about a horizontal axis, to define a dumping body, and wherein the axis for said hinge connection between said tow bar and said vehicle frame is parallel to said dumping axis;

and the parts of said tow bar being relatively movable in the stored position of said trailer hitch assembly to permit the dumping of said platform type body.

References Cited by the Examiner

UNITED STATES PATENTS

| | | | |
|---|---|---|---|
| 2,041,640 | 5/1936 | Goss | 280—166 |
| 2,799,531 | 7/1957 | Vine | 298—17 |
| 3,171,673 | 3/1965 | Webber | 280—484 X |

BENJAMIN HERSH, *Primary Examiner.*

RICHARD J. JOHNSON, *Examiner.*